R. J. MARKOE.
Corn-Planter.
No. 213,995. Patented April 8, 1879.
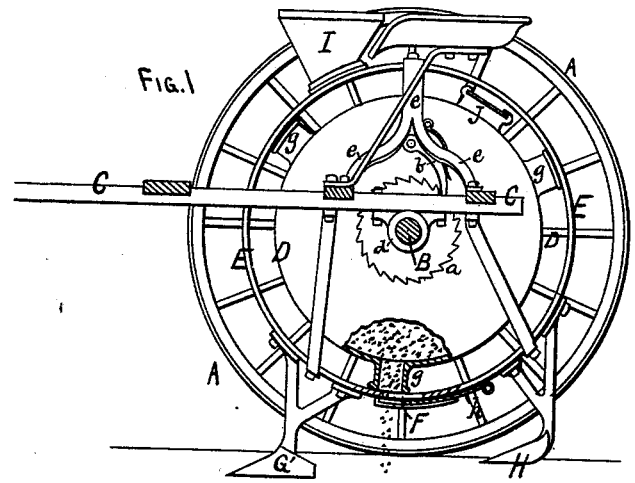
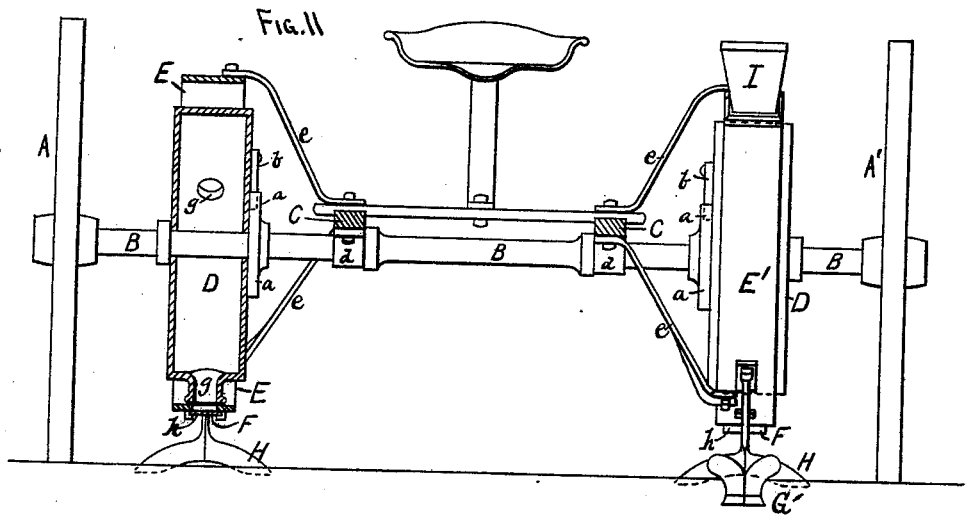
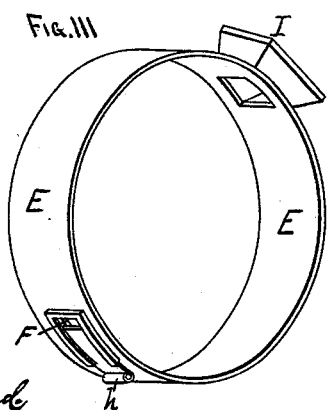
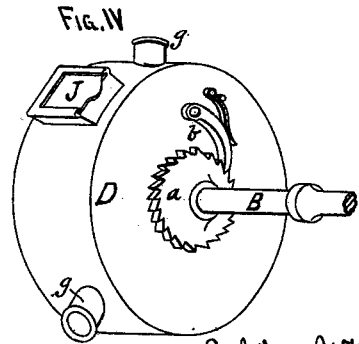
WITNESSES.
C. N. Woodward
J. H. Fitz
Ralston J. Markoe,
INVENTOR, By
Louis Fraser & Co.
Attys.

UNITED STATES PATENT OFFICE.

RALSTON J. MARKOE, OF WHITE BEAR, MINNESOTA.

IMPROVEMENT IN CORN-PLANTERS.

Specification forming part of Letters Patent No. 213,995, dated April 8, 1879; application filed October 12, 1878.

*To all whom it may concern:*

Be it known that I, RALSTON JOSHUA MARKOE, of White Bear, in the county of Ramsey, and State of Minnesota, have made certain new and useful Improvements in Corn-Planters, which improvements are fully set forth in the following specification and accompanying drawings, in which—

Figure 1 is a sectional side elevation. Fig. 2 is a front elevation, partially in section; Figs. 3 and 4, detail perspective views of one of the stationary guards and revolving drums detached.

This invention relates to certain improvements in corn-planters; and consists, first, of a drum provided with radial tubes or curbs, in combination with a stationary guard provided with an adjustable opening, as will be hereinafter explained; second, in the peculiar combination and arrangement of the drum, conveying-tubes, pawl and ratchet, and axle, as will be hereinafter more fully explained; and, third, in the peculiar combination and arrangement of the drums, pawl and ratchet, axle, and guard with furrow openers and closers, as will be hereinafter more fully explained.

A A' are two wheels, fast upon an axle, B, which revolves with them; and C, the thills or tongue for the horses. D D are two drums, mounted loosely upon the axle B, with which they are made to revolve by a ratchet and pawl, *a b*. E E' are two circular bands or guards, encircling the drums D, and at a short distance from them. They are secured to the axle and thills by means of collars *d* and braces *e*, so that they will not revolve with the axle B.

At equal distances apart upon the periphery of the drums D are perforations, provided with short tubes or curbs *g*, which are made long enough to nearly reach the guards E. The tubes *g* extending radially beyond the periphery of the drum forms a receptacle for a greater or less charge of seed before reaching the opening in the guard, and produces much less friction against the guard than would be the case if the entire periphery of the drum ran in contact with the guard.

F are openings in the lower part of the guards E, supplied with slides *h*, so that the size of the openings may be regulated. These openings are arranged to come directly opposite the tubes *g* when the drums revolve, and thus allow the corn to drop through, as hereinafter more fully explained.

G' G' are small cultivator-tooth-shaped furrow-openers, secured to the guards E forward of the openings F, and project down below the line of the wheels A, by which small furrows are made in the ground for the reception of the seed, while scrapers or coverers H H, attached to the guards E in the rear of the openings F, serve to throw the earth back into the furrows made by the teeth G', and thus cover the seed.

I I are hoppers upon the guards E E'; and J, slide covered doors in the drums D, through which the seed is placed in the drums.

When it is desired to use the machine it is pulled through the ground far enough for the furrow-openers G' to form furrows for the first hills, and bring the openings F directly or nearly above the place intended for the first row. The machine is then stopped and the pawls *b* released from the ratchets *a*, and the drums D turned until one set of the tubes *g* come just forward of the openings F, and the pawls again thrown down upon the ratchets, so that when the machine again starts the tubes *g*, running over the openings F, will drop sufficient corn into the furrow to form one hill. The tubes then passing onward are removed from over the holes F, and again come in contact with the solid part of the guards E E', which thus prevent the corn from escaping until another set of tubes *g* comes opposite to the openings F.

The size of the wheels A will be so arranged in relation to the distance between the tubes *g* as to bring them into position at the proper points to form the rows at the requisite distances apart.

By this simple arrangement the corn is planted in regular rows with only one marking, or with the rows marked in but one direction.

Usually two of the drums D will be arranged upon one axle, B, so as to plant two rows at once, and large enough to plant three hills at each revolution of the wheels A; but this may be varied at pleasure.

The openings F, as before described, will be provided with adjustable slides h, so that the quantity of corn planted in one hill may be regulated.

Grooved rollers may be substituted for the coverers H H, or used in connection with them, if desired, to press the earth upon the seed after planting.

Having thus described my invention, what I claim as new, and desire to secure by Letters Patent, is—

1. The drum D, provided with radial tubes or curbs g, in combination with the stationary guard E, provided with adjustable opening F, substantially as hereinbefore described.

2. The combination and arrangement of the drum D, provided with the tubes g and pawl b, and the axle B, provided with the ratchet a, substantially as hereinbefore specified.

3. The combination and arrangement of the drums D g, axle B, pawl b, ratchet a, guard E F h, and furrow openers and closers G' H, substantially as hereinbefore set forth.

In testimony whereof I have hereunto set my hand in the presence of two subscribing witnesses.

RALSTON JOSHUA MARKOE.

Witnesses:
C. N. WOODWARD,
LOUIS FEESER.